(12) United States Patent
Cheron

(10) Patent No.: US 6,936,987 B2
(45) Date of Patent: Aug. 30, 2005

(54) METHOD FOR CONTROLLING AN ELECTRIC MOTOR DRIVING A BODY IN TRANSLATION

(75) Inventor: Eric Cheron, Taninges (FR)

(73) Assignee: Somfy, Cluses (FR)

( * ) Notice: Subject to any disclaimer, the term of this patent is extended or adjusted under 35 U.S.C. 154(b) by 72 days.

(21) Appl. No.: 10/363,869

(22) PCT Filed: Aug. 31, 2001

(86) PCT No.: PCT/IB01/01578

§ 371 (c)(1), (2), (4) Date: Mar. 10, 2003

(87) PCT Pub. No.: WO02/23005

PCT Pub. Date: Mar. 21, 2002

(65) Prior Publication Data

US 2004/0027081 A1 Feb. 12, 2004

(30) Foreign Application Priority Data

Sep. 15, 2000 (FR) .......................... 00 11812

(51) Int. Cl.[7] ............................................. H02P 7/00
(52) U.S. Cl. ................... 318/468; 318/369; 318/430; 318/466
(58) Field of Search ................... 318/468, 369, 318/430, 466, 432, 469, 266

(56) References Cited

U.S. PATENT DOCUMENTS

| | | | | |
|---|---|---|---|---|
| 3,639,823 A | * | 2/1972 | Leglise | 318/595 |
| 3,918,201 A | * | 11/1975 | Graziano | 49/28 |
| 4,558,265 A | * | 12/1985 | Hayashida et al. | 318/561 |
| 4,706,180 A | | 11/1987 | Wills | |
| 5,170,108 A | * | 12/1992 | Peterson et al. | 318/469 |
| 5,353,859 A | | 10/1994 | Leppert | |
| 5,378,861 A | | 1/1995 | Toutaoui | |
| 5,621,295 A | | 4/1997 | Vanderschaeghe | |
| 5,847,531 A | * | 12/1998 | Hoffsommer et al. | 318/696 |
| 6,680,597 B1 | * | 1/2004 | Catellani et al. | 318/696 |

FOREIGN PATENT DOCUMENTS

| | | |
|---|---|---|
| DE | 43 31 781 A | 3/1995 |
| EP | 0 503 344 A | 9/1992 |
| FR | 2 659 161 A | 9/1991 |
| FR | 2 717 016 | 9/1995 |

OTHER PUBLICATIONS

International Search Report in SN PCT/IB01/101578.

* cited by examiner

Primary Examiner—Rita Leykin
(74) Attorney, Agent, or Firm—Frommer Lawrence & Haug LLP; Ronald R. Santucci

(57) ABSTRACT

The invention concerns a method for controlling an electric motor driving a body in translation between an initial position and a final position determined by a stop, by powering the motor with reduced voltage in the final position approach phase. The motor has a torque/speed characteristic such that the torque at null speed decreases with the supply voltage. As the approach phase starts, the method consists in determining a reduced voltage by decreasing the rotational speed of the motor from a nominal value to a predetermined reduced value and in cutting the motor power supply if the motor rotational speed drops below a predetermined threshold value.

18 Claims, 3 Drawing Sheets

METHOD FOR CONTROLLING AN ELECTRIC MOTOR DRIVING A BODY IN TRANSLATION

This application is a 371 of PCT/IB01/01578 filed on Aug. 31, 2001, published on Mar. 21, 2002 under publication number WO 02/23005 A1 which claims priority benefits from French patent application number FR 00/11812 filed Sep. 15, 2000.

BACKGROUND OF THE INVENTION

The subject of the invention is a method of controlling an electric motor driving a body in translation between an initial position and a final position determined by an abutment, according to which the motor is supplied at reduced voltage in the phase of approach to the final position.

The subject of the invention is also a device for the implementation of this method.

The invention relates more particularly to devices for shading and for solar protection such as doors and venetian blinds, arm-mounted blinds, etc.

PRIOR ART

Such a method and such devices are known from the patent FR 2 717 016 in the name of the applicant. This patent teaches the instigating of a particular supply phase for the motor, in particular the reducing of the voltage, in the phase of approach to the final position determined by an abutment. This particular supply phase is obtained by means of an electric circuit which reduces the torque of the motor. The motor used is an asynchronous motor with capacitor whose operating curve is represented as a reminder in FIG. 1 of the appended drawing, in which the torque C is represented along the ordinate and the speed N is represented along the abscissa. FIG. 1 represents two curves for two different supply voltages, that is to say two different abutment torques. These curves have a common point, the no-load speed, that is to say for a torque equal to zero. It is noted that a decrease in the abutment torque also entails a decrease in the torque available to drive the load. This method and the device for its implementation are suitable for installations in which the resisting torque due to the load reduces by itself before the instigation of the particular supply phase. Such is the case with windup shutters where the influence of the weight of the shutter decreases as it is wound up and for arm-mounted blinds where the effort required drops steeply once the arms have unlocked and for which the torque, at this instant, is generally small and hardly influenced at all by the weight of the fabric. In this case, it is possible to use one and the same circuit for rolling shutters or arm-mounted blinds of different weights. For certain installations, the fact that it is not possible to reduce the abutment torque without reducing the torque available in the approach phase, constitutes a considerable drawback. Such is the case with installations where the resisting torque remains substantially constant throughout the movement of the moving body, for example installations of the venetian blind type. In this case, the characteristics of the motor must be chosen in such a way that the torque under load is similar to the abutment torque. This requires a matching of the operating characteristic of the motor, that is to say of the control circuit, or even of the motor itself, to each weight of body driven.

SUMMARY OF THE INVENTION

The objective of the invention is to remedy this drawback, that is to say to obtain automatic matching of the operating characteristic of the motor to the load.

The method according to the invention is characterized in that a motor is used whose torque/speed characteristic is such that the zero-speed torque decreases with the supply voltage, in that at the start of the approach phase a reduced voltage is determined by decreasing the speed of rotation of the motor from a nominal value to a predetermined reduced value and the supply to the motor is cut if the speed of rotation of the motor falls below a predetermined threshold value.

Motors exhibiting such a characteristic are very well-known motors, such as separately excited DC motors, brushless motors and universal motors. With, as sole reference, the speed, a matching of the abutment force to the load is thus obtained without any expedient.

The control of the speed of a motor driving a venetian type blind is certainly known, for example from the patent U.S. Pat. No. 5,170,108. This control is however performed only so as to maintain the speed of movement of the blind within a certain span and to halt the motor when the speed falls below a minimum, this drop being interpreted as an obstacle or an abutment.

According to a first mode of implementation of the method, to reduce supply voltage corresponding to the predetermined reduced speed is maintained throughout the approach phase. Hence, one merely reduces the voltage once.

According to a second mode of implementation of the method, during the phase of approach to the final position, the motor is supplied at reduced voltage while controlling the speed in such a way as to maintain it at the predetermined value. In this way, in the approach phase, the torque is continuously tailored to the residual load and the abutment torque is correspondingly reduced.

According to another mode of implementation of the method, during the phase preceding the phase of approach to the final position, the motor is supplied at a voltage such that the speed of the motor is equal to a predetermined speed. In this way, the speed of movement of the body is substantially identical from one installation to another, regardless of its weight.

The subject of the invention is also a device for the implementation of the method characterized in that it comprises means for measuring the speed of the motor, an LPU (logic processing unit) and an LPU-motor power interface.

According to one mode of execution of the device, the means for measuring the speed of the motor consist of a sensor delivering pulses and the LPU comprises means for calculating the position and the speed of the motor, a memory in which is permanently recorded the instantaneous position of the motor, speed and threshold presets and a preset for entry into the phase of approach to the final position, a program for comparing the position and the measured speed with presets and means for generating a power interface control signal.

According to one mode of execution, the power interface consists of a chopped supply and the LPU comprises a pulse generator and pulse-width modulation means, the modulated pulses being applied to the chopped supply.

According to another mode of execution, the power interface consists of a stabilized and frequency-regulated supply and the control signal generated by the LPU is a signal of variable frequency.

BRIEF DESCRIPTION OF THE DRAWINGS

The method according to the invention and its means of implementation will be described in greater detail in conjunction with the appended drawing in which.

DETAILED DESCRIPTION OF THE PREFERRED EMBODIMENT(S)

Figure 1:
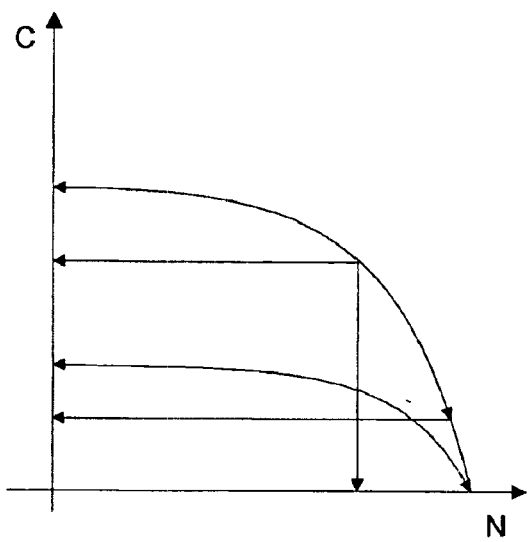
FIG. 1 represents two curves for two different supply voltages, that is to say two different abutment torques.
Figure 2:
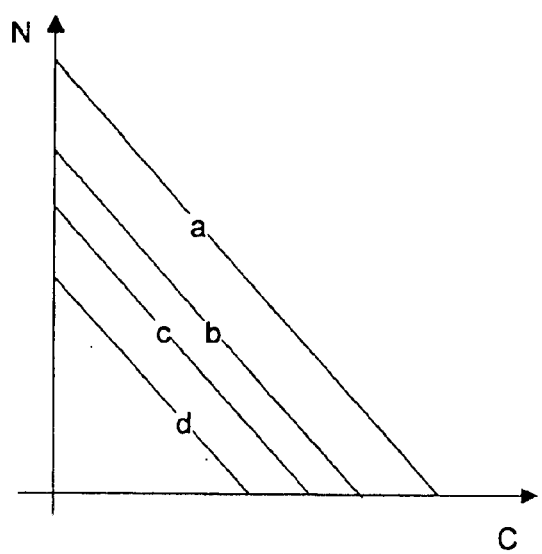
FIG. 2 diagrammatically represents the torque/speed characteristic of the motor used in the method according to the invention, for various supply voltages of the motor.

In the chart represented in FIG. 2, the straight line a diagrammatically represents the shape of the torque/speed characteristic, that is to say of the relation between the torque and the speed for a specified supply voltage. This characteristic is very approximately a straight line. The characteristic shifts parallel to itself when the supply voltage varies. The curves b, c and d correspond to three different supply voltages, the supply voltage decreasing from curve a to curve d.

In the initial phase, the motor is supplied at the nominal voltage Un. The corresponding characteristic of the motor is represented by the curve a in FIG. 3.

In the particular supply phase, that is to say the phase of approach to the final position, the supply voltage of the motor is decreased until the speed of the motor is equal to a predetermined value V2, for example 30 rpm. As may be seen in FIG. 3, the operating characteristic of the motor at the speed V2, that is to say its supply voltage, varies with the load. For a load of 0.8 Nm we are located on curve c. The abutment torque, that is to say the torque at zero speed, is substantially equal to 1 Nm.

If, for example, the load is equal to 0.5 Nm, one is then located on curve c and the torque at the abutment is substantially equal to 0.7 Nm. Thus, by adjusting the speed by means of the voltage and without any other expedient, the torque at the abutment is automatically tailored to the load.

Figure 4:
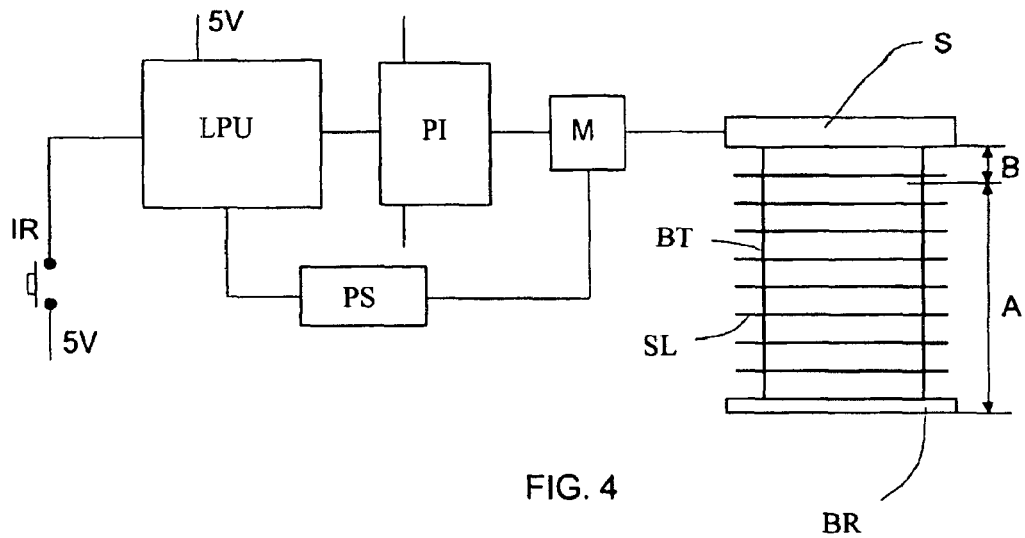
FIG. 4 is a block diagram of a device for the implementation of the method in its application to the driving of a venetian blind.

FIG. 4 diagrammatically represents the application of the invention to the driving of a blind S of venetian blind type, that is to say comprising a bottom rail BR and slats SL which stack up in the raised position of the blind. This blind is driven by a motor M supplied by way of a power interface PI controlled by a logic processing unit LPU. With the motor is associated a position sensor PS for example a Hall effect sensor linked to the spindle of the motor and delivering pulses making it possible to ascertain both the position of the spindle of the motor, that is to say the position of the shaft for winding up the belts BT of the blind and the speed of the motor. The pulses delivered by the sensor are processed by the LPU which calculates the position of the motor and its speed of rotation. The LPU comprises a memory in which the instantaneous position of the motor is continuously recorded. In a learning phase, the memory also records speed presets V1, V2 and threshold presets as well as the preset for the position of entry into the particular supply phase. The LPU is programmed to compare the speed calculated at part of the pulses delivered by the sensor with one or other of the speed presets V1, V2 and threshold preset and to deliver a PWM (pulse width modulated) signal to the power interface PI which constitutes a chopped supply. The LPU is also programmed to compare the position calculated from the pulses delivered by the sensor with the position preset recorded in memory.

PWM generators are described in detail in the publication "INTELLIGENT MOTION PROCEEDING" of June 1993, pages 230 to 236, as well as in the works "DESIGNERS' GUIDE TO POWER PRODUCTS" Application Manual, $2^{nd}$ edition June 1992 by SGS-THOMSON microelectronics, pages 309 to 322, the publication "POWER SEMICONDUCTOR APPLICATIONS" by PHILIPS, pages 3–4 to 3–10 and the SIEMENS publication "3-Phase Sine Wave Generation with the SAB 80C515A and SAB 80C17A" by Nikolaos Papadopoulos, Siemens Semiconductor Division, Rev. 2.0-e, March 1992.

PWM-based motor control is moreover described in the patent U.S. Pat. No. 4,706,180.

The installation is controlled by a breaker IR, the closing of which is interpreted by the LPU as an order to move.

Represented diagrammatically alongside the unwound blind is the initial phase of movement A and the final phase B, that is to say the phase of approach to the docking position.

The installation represented in FIG. 4 can be embodied in another way. For example, the power interface could consist of a stabilized supply, for example frequency-regulated. In this case, the LPU would deliver a signal of variable frequency to the stabilized supply.

Figure 5:
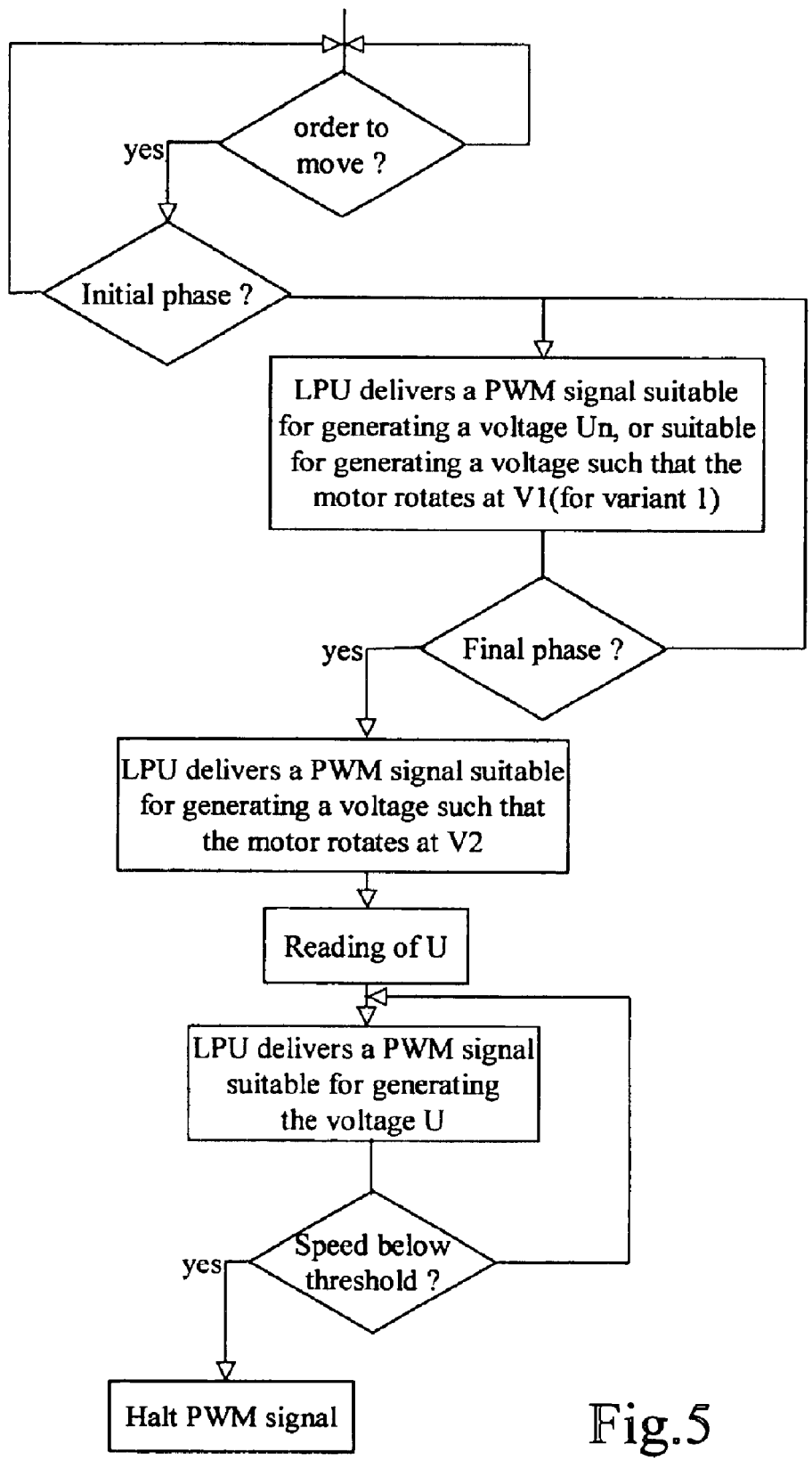

In its basic programming, the LPU is programmed according to the basic logic diagram represented in the bottom half of the logic diagram of FIG. 5.

On entering the approach phase designated in FIG. 5 by the final phase, the LPU delivers a PWM signal suitable for generating a voltage such that the motor rotates at the speed V2 and delivers a PWM signal suitable for generating a voltage U. This voltage is maintained throughout the approach phase. The LPU continues to test the speed. As long as this speed is greater than the threshold S, the voltage U is maintained. When the speed goes below the predetermined threshold, the LPU ceases to deliver the PWM signal and the supply to the motor is cut. The dropping of the speed below the threshold S signifies that the bottom rail of the blind has arrived at the abutment.

A first improvement of the method is represented by the upper part of the logic diagram in FIG. 5. According to this improvement, in the initial phase, the motor is supplied at a voltage such that the speed of the motor has a predetermined value V1. In this way, the speed of movement of the blind is substantially identical from one installation to another regardless of its weight. In the case of several blinds operating simultaneously on one and the same facade of a building, a coordinated and hence more harmonious overall motion of the blinds is obtained.

Figure 3:
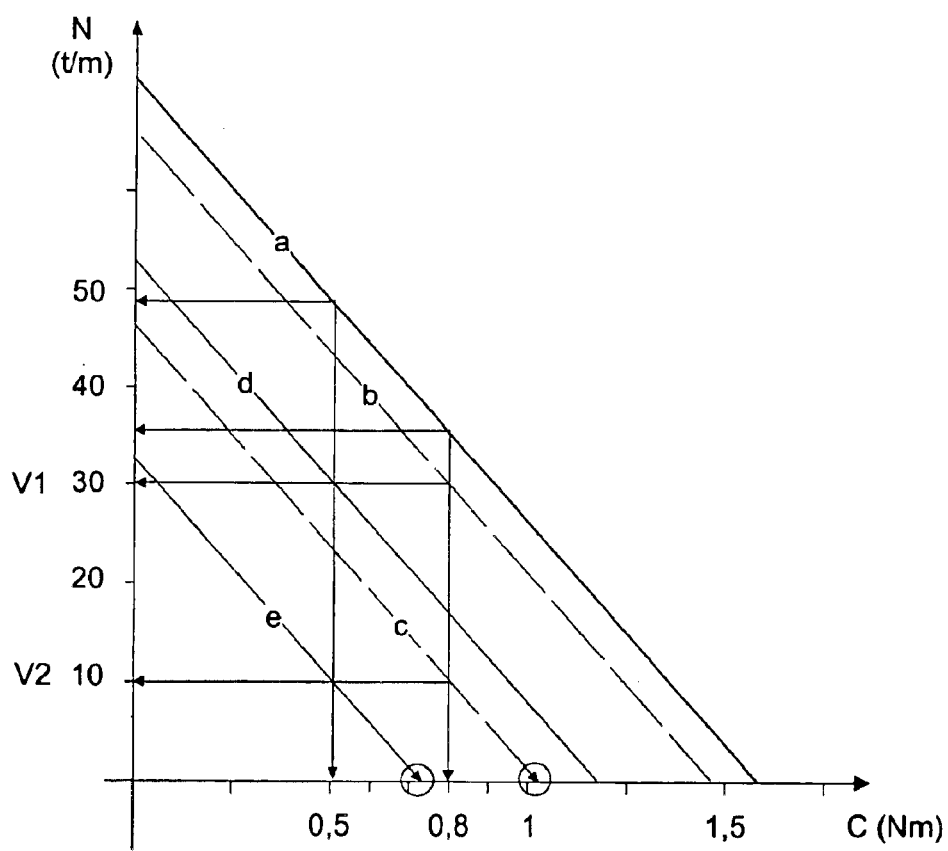
FIG. 3 is a chart similar to that of FIG. 2 comprising values illustrating the method according to the invention.

In FIG. 3, the curves b and d represent characteristic curves corresponding to a motor supply voltage such that the speed V1 is equal to 30 rpm for the loads of 0.8 Nm (b) and 0.5 Nm (d).

Figure 6:
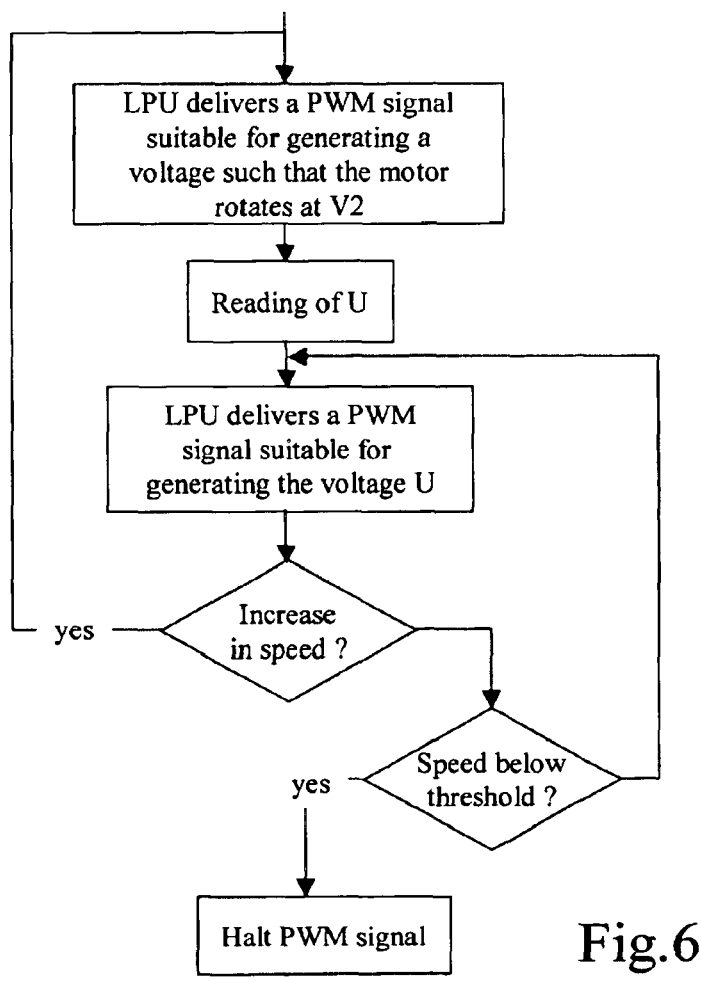
FIG. 5 represents the flowchart of the program of the LPU according to a first mode of execution of the method and FIG. 6 represents the flowchart of the LPU according to a second mode of execution of the method.

A second improvement is represented in FIG. 6 which represents a modification of the basic program.

As in the basic program, on entering the final phase, the LPU delivers a PWM signal suitable for generating a voltage such that the motor rotates at the speed V2, then reads the corresponding voltage U and delivers a PW signal suitable for generating this voltage U. Next, in contradistinction to the basic program, this voltage U is not maintained throughout the final phase, rather the LPU continuously tests whether the speed V2 is maintained. If the speed increases, the LPU reduces the supply voltage U until the speed V2 is regained. In this manner, the torque is continuously tailored to the residual load and the abutment torque is correspondingly reduced. Moreover, by avoiding an increase in speed in the final phase, the aesthetics of the motion of the blind are enhanced. An increase in the speed of the blind may result from a decrease in the load due, for example, to the effect of the moving weight or to the disappearance of friction or else to a momentary overload present at the time of the initialization of the particular supply phase.

The method according to the invention is applicable to any body moving in translation and whose weight hardly varies during the movement. Such is also the case with rigid doors and counterweight doors. The movement may be horizontal or vertical. In the case of a rigid curtain moving vertically, the method is also applicable for the halting of the curtain at the bottom point.

The preferred application of the method does not exclude its application in the case of weight variation. In this case, the advantage of a reduced abutment force is also present.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method of controlling an electric motor driving a body in translation between an initial position and a final position determined by an abutment, according to which the motor is supplied at a reduced voltage in an approach phase to the final position, wherein the motor has a torque/speed characteristic such that a zero-speed torque decreases with a supply voltage, in that at the start of the approach phase the reduced voltage is determined by decreasing a speed of rotation of the motor from a nominal value to a predetermined reduced value and the supply voltage to the motor is cut if the speed of rotation of the motor falls below a predetermined threshold value, the supply voltage being maintained at most equal to the determined reduced voltage during the approach phase.

2. The method as claimed in claim 1, wherein a nominal supply voltage of the motor is determined in a phase preceding the approach phase by bringing the speed of the motor to a predetermined nominal speed and in that this nominal voltage determined using the phase preceding the approach phase is maintained.

3. A device for implementing the method as claimed in claim 1, which further comprises means for measuring the speed of the motor (PS), a logic processing unit (LPU) and an LPU-motor power interface (PI).

4. The device as claimed in claim 3, wherein the means for measuring the speed of the motor consist of a sensor (PS) delivering pulses and that the LPU comprises means for calculating the position of the speed of the motor, a memory in which is permanently recorded the instantaneous position of the motor, speed and threshold presets and a preset for entry into the phase of approach to the final position, a program for comparing the position and the measured speed with presets, and means for generating a power interface control signal.

5. The device as claimed in claim 4, wherein the power interface consists of a chopped supply and that the LPU comprises a pulse generator and pulse-width modulation means, the modulated pulses being applied to the chopped supply.

6. The device as claimed in claim 4, wherein the power interface consists of a stabilized and frequency-regulated supply and that the control signal generated by the LPU is a signal of variable frequency.

7. The method as claimed in claim 1, wherein the speed of rotation of the motor is monitored by a sensor located on the motor.

8. A method of controlling an electric motor driving a body in translation between an initial position and a final position determined by an abutment, without measuring an actual speed of the body, comprising the steps of:

deciding to enter in an approach phase to the final position;

reducing a voltage supplied to the motor in order to reduce the speed from a nominal value to a predetermined reduced speed value;

maintaining the voltage at most equal to the value obtained in the reducing step; and stopping to supply the voltage if a rotational speed of the motor falls below a predetermined threshold value.

9. The method according to claim 8, wherein during the approach phase, the voltage is maintained equal to the value obtained in the reducing step.

10. The method according to claim 8, wherein during the approach phase, the voltage is reduced again so as to bring the speed of rotation to its predetermined reduced value if the speed of rotation increases.

11. The method as claimed in claim 8, wherein a nominal supply voltage of the motor is determined in a phase preceding the approach phase by bringing the speed of the motor to a predetermined nominal speed and in that this nominal voltage determined using the phase preceding the approach phase is maintained.

12. The device for implementing the method as claimed in claim 8, which further comprises means for measuring the speed of the motor (PS), a logic processing unit (LPU) and an LPU-motor power interface (PI).

13. The device as claimed in claim 12, wherein the means for measuring the speed of the motor consist of a sensor (PS) delivering pulses and that the LPU comprises means for calculating the position of the speed of the motor, a memory in which is permanently recorded the instantaneous position of the motor, speed and threshold presets and a preset for entry into the phase of approach to the final position, a program for comparing the position and the measured speed with presets, and means for generating a power interface control signal.

14. The device as claimed in claim 13, wherein the power interface consists of a chopped supply and that the LPU comprises a pulse generator and pulse-width modulation means, the modulated pulses being applied to the chopped supply.

15. The device as claimed in claim 13, wherein the power interface consists of a stabilized and frequency-regulated supply and that the control signal generated by the LPU is a signal of variable frequency.

16. The method as claimed in claim 8, wherein the speed of rotation of the motor is monitored by a sensor located on the motor.

17. The method as claimed in claim 1, wherein said determined reduced voltage is maintained during the approach phase.

18. The method as claimed in claim 1, wherein the variation in the speed of rotation of the motor is monitored during the approach phase and in that, if the speed of rotation increases with respect to its predetermined reduced value, the supply voltage of the motor is reduced so as to bring the speed of rotation of the motor down to its predetermined reduced value.

* * * * *